(12) United States Patent
Naydenov et al.

(10) Patent No.: US 9,708,954 B2
(45) Date of Patent: Jul. 18, 2017

(54) VEHICULAR FLUID INJECTION SYSTEM, CONTROLLER AND METHOD FOR HEATING SAID FLUID INJECTION SYSTEM

(75) Inventors: Volodia Naydenov, Louvain-La-Neuve (BE); Stephane Leonard, Brussels (BE); Guillaume Zeller, Brussels (BE); Florent Barzic, Munich (DE); Benone Dorneanu, Ath (BE); Laurent Etorre, Schaerbeek (BE)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 0 days.

(21) Appl. No.: 14/234,270

(22) PCT Filed: Jul. 17, 2012

(86) PCT No.: PCT/EP2012/063950
§ 371 (c)(1),
(2), (4) Date: Mar. 13, 2014

(87) PCT Pub. No.: WO2013/011005
PCT Pub. Date: Jan. 24, 2013

(65) Prior Publication Data
US 2014/0208719 A1    Jul. 31, 2014

(30) Foreign Application Priority Data

Jul. 20, 2011  (EP) .................................. 11174746

(51) Int. Cl.
*F01N 3/20*  (2006.01)
*F01N 3/28*  (2006.01)

(52) U.S. Cl.
CPC .......... *F01N 3/208* (2013.01); *F01N 3/2013* (2013.01); *F01N 3/2066* (2013.01);
(Continued)

(58) Field of Classification Search
CPC ........ F01N 9/002; F01N 3/0842; F01N 3/035; F01N 3/0814; F01N 3/2066; F01N 13/02; F02D 41/029; F02D 41/0275
(Continued)

(56) References Cited

U.S. PATENT DOCUMENTS 5,093,583 A * 3/1992 Mashino et al. ............. 307/10.1
5,345,761 A    9/1994 King et al.
(Continued)

FOREIGN PATENT DOCUMENTS

DE    44 21 066    1/1995
DE    199 40 802   4/2001
(Continued)

OTHER PUBLICATIONS

International Search Report Issued Oct. 24, 2012 in PCT/EP12/063950 Filed Jul. 17, 2012.
(Continued)

*Primary Examiner* — Patrick Maines
(74) *Attorney, Agent, or Firm* — Oblon, McClelland, Maier & Neustadt, L.L.P.

(57) ABSTRACT

A vehicular fluid injection system including a storage tank, an injection line, a heating system including an electrical heating element being powered by a power source, and a voltage converter inserted between the power source and the heating element, alone or combined with a PWM power regulation.

12 Claims, 2 Drawing Sheets

(52) U.S. Cl.
    CPC ........ *F01N 3/2882* (2013.01); *F01N 2610/02* (2013.01); *F01N 2610/10* (2013.01); *F01N 2610/14* (2013.01); *Y02T 10/24* (2013.01); *Y02T 10/26* (2013.01)

(58) Field of Classification Search
    USPC .......... 60/274, 273, 285, 286, 295, 301, 303
    See application file for complete search history.

(56) References Cited

U.S. PATENT DOCUMENTS

| | | |
|---|---|---|
| 5,580,477 A | 12/1996 | Oota et al. |
| 2006/0119277 A1* | 6/2006 | Ito et al. .................. 315/106 |
| 2008/0121022 A1* | 5/2008 | Koike et al. ................ 73/49.2 |
| 2010/0242439 A1* | 9/2010 | Domon et al. .............. 60/274 |
| 2012/0103433 A1* | 5/2012 | Koonce .................... 137/341 |
| 2015/0071624 A1* | 3/2015 | Chang ....................... 392/465 |

FOREIGN PATENT DOCUMENTS

| | | | |
|---|---|---|---|
| DE | 10 2008 000 549 | | 11/2008 |
| EP | 2 339 138 A1 | | 6/2011 |
| JP | 5 38073 | | 2/1993 |
| JP | 07107737 A | * | 4/1995 ............ H02M 3/155 |
| WO | 2008/138960 A1 | | 11/2008 |

OTHER PUBLICATIONS

European Search Report Issued Nov. 16, 2011 in European Patent Application No. 11174746.5 Filed Jul. 20, 2011.

\* cited by examiner

VEHICULAR FLUID INJECTION SYSTEM, CONTROLLER AND METHOD FOR HEATING SAID FLUID INJECTION SYSTEM

The present invention pertains to a vehicular fluid injection system and to a controller and a method for heating said fluid injection system.

Heating systems for vehicular fluid tanks/injection systems, in particular for tanks/lines intended to hold or vehicle liquids which can freeze at normal winter temperatures, such as ammonia precursor solutions used in selective catalytic reduction reactions (SCR) to treat exhaust gas from internal combustion engines, are known in the art. A commonly used type of precursor solution is a eutectic liquid mixture of water and urea, which is commercially available under the trademark AdBlue®. This solution is known to freeze at temperatures below approximately −11° C., a condition which regularly occurs during winter time in many areas of the world. Hence, it is necessary under these conditions to thaw a quantity of the stored solution before the reduction of the NOx compounds in the exhaust gas can start taking place.

Hence, heating systems have been developed, in which it is important to avoid:
overheating of the ammonia precursor solution, which could lead to unpleasant odors and even to undesirable alterations of the properties of the solution; but also
a too low heating power, which could lead to issues in cold start situations.

One prior-art solution to this problem is to use heating elements with a resistance that has a positive temperature coefficient (PTC), thus providing a certain amount of self-regulation. However, when the PTC is warm, less heating power is available. Besides, since the current consumption varies with temperature, a diagnosis of the heater based on the plausibility of the current consumption is difficult.

In typical automotive situations, the power supply voltage can range between 9 and 16 Volt, depending on the overall instantaneous load on the electrical system. The supply voltage fluctuates as various electrical functions switch on and off, as a result of actions by the vehicle operator or instructions from the vehicle electronics. Typically, these electrical functions are a mix of high-consumption functions such as an air conditioning unit and a rear window defroster, and low-consumption unit such as various electronic circuits and indicators. These functions may cycle through on and off status at very diverse timescales. As a result, the amount of heat dissipated by the resistive element will also fluctuate, making it difficult to control the precise conditions under which the content of the vehicular fluid tank will be thawed and/or heated.

The controllability of the heating conditions is a serious concern for SCR systems, because vehicle manufacturers want to ensure a sufficiently rapid thawing process to comply with applicable emission standards, in particular with respect to NOx emissions, while avoiding overheating of the ammonia precursor solution. It is a further concern to avoid overheating of the heating system itself, including for example the control unit, the fluid container, the wiring and the resistive elements.

It is an object of the present invention to provide a heating system of the kind described above that meets the above concerns.

According to one aspect of the invention, there is thus provided a vehicular fluid injection system comprising a storage tank, an injection line and a heating system comprising an electrical heating element being powered by a power source, wherein a voltage converter is inserted between the power source and the heating element.

According to the invention, the heating power is regulated using a step-up or step-down voltage converter which insures a constant heating voltage and guarantees a constant heating power compensating for the variation of the input power supply (at least in part of the range of from 9 to 16 V generally available on a vehicle's battery). In this way, the heating power and the heating performances of the fluid injection system (like an SCR system) are guaranteed over at least part of the input power supply. The provided heating power depends on the kind of heating elements (resistance) and can be, for example, between 50 W and 500 W.

Thanks to the invention, the thermal stress of the system components is reduced and the EMC performances (electromagnetic capability or compatibility) of the heater (i.e. the extent to which it will tolerate electrical interference from other equipment) are improved.

The vehicular fluid injection system of the invention may be any injection system onboard a vehicle for a fluid freezing in normal winter conditions. Said fluid preferably is an ammonia precursor solution used in a selective catalytic reduction (SCR) of the exhaust gases of the vehicle as described above.

The heating system of the invention generally comprises, besides at least one electrical heater, electrical connections for connecting said heater to a power source (power supply voltage) and to the ground. In the frame of the invention, the power source generally is the battery (VBAT) of a vehicle (truck, car . . . ).

The electrical heating element of the invention may be any kind of resistive heating element, from a mere resistive wire—eventually shapeable as described in EP 2339138 in the name of the applicant, the content of which is incorporated by reference in the present application—to a flexible heater (a heater comprising at least one resistive track affixed to a flexible film and/or placed between two flexible films) as the one described in WO 2008/138960, also in the name of the applicant and the content of which being also incorporated by reference in the present application.

The system of the invention comprises a storage tank and an injection line generally extending from the tank to an injector and through which the fluid is generally made to circulate thanks to a pump.

According to the invention, a voltage converter is inserted between the power source and the heating element. The invention also gives good results when several heating elements are used, for instance: at least one in the tank and at least one in the injection line. Generally, at least one electrical connection connects the power supply to the voltage converter and one or several electrical connections connect said converter to the one or more electrical heating elements. There generally also is an electrical connection between the ground (GND) and the voltage converter.

Preferably, the voltage converter of the invention is integrated into a controller, generally an SCR controller.

The voltage convertor of the invention generally is a DC-to-DC converter i.e. an electronic circuit which converts a source of direct current (DC) from one voltage level to another, said other level being lower than the former one in the case of a step-down converter, and vice versa in the case of a step-up converter.

DC-to-DC converters generally comprise an inductor and a diode, and they may also comprise other components like a controller, power MOSFET switches, filter capacitors, a shunt for current measurement etc.

In a preferred embodiment, the DC-to-DC converter is adapted to electronically vary its voltage output, preferably in a step by step manner (for instance, from a power of 200 W to a power of 100 W and then of 50 W). This embodiment is advantageous namely for start & go engines (in order to be able to reduce the voltage and hence, the power consumption when the engine is stopped) but also, for regular engines in order for instance to be able to adapt the power consumption to the real needs (for instance: high power at cold start and reduced power afterwards, when the liquid has thawed).

Hence, the present invention also concerns a vehicle equipped with a start & go engine and with a vehicular fluid injection system as described above.

According to another aspect of the invention, there is provided a controller for a vehicular fluid injection system equipped with a heater, said controller being an electronic control unit (ECU) integrating a voltage converter able of providing the heater with a substantially constant voltage over at least a portion of the power range supplied by the power source (generally from 9 to 16 V, with a nominal value of 13.5 V, in the case of the vehicle's battery). Preferably, said voltage is constant over the entire power range. In a preferred embodiment, the voltage converter is DC-to-DC converter adapted to electronically vary its voltage output, preferably in a step by step manner.

According to still another aspect of the invention, there is provided a method for heating at least one part of a vehicular fluid injection system with at least one resistive element receiving an electric current from a power supply, according to which a voltage convertor is inserted between the power source and the heating element so as to provide the resistive heating element with a substantially constant voltage over at least a portion of the power range supplied by the power source. Again, preferably, the voltage converter is DC-to-DC converter adapted to electronically vary its voltage output, preferably in a step by step manner.

All the preferred embodiments set forth above in the description of the fluid injection system do apply to the method of the invention.

By "substantially constant voltage", it is meant that a variation of less than 1% is allowed on said voltage.

These and other aspects of the invention will be better understood by reference to the following figures, in which:

FIG. 1 shows an example of electrical connections between a vehicle battery (VBAT), ground (GND), an SCR controller integrating a voltage converter and several heaters (2 tank heaters and 2 line heaters in this case, for instance: a supply line and a return line, returning the excess of urea, not consumed by the SCR system, to the storage tank).

The step-down converter of this example is conceived to produce a constant heating voltage lower than the VBAT supply voltage in most cases, namely VBAT=9 to 16 V
Heater 1, 2, 3 or 4: Voltage=9 V if VBAT>=9 V
If VBAT<9 V, the heating voltage will follow VBAT, but in this case the under-voltage protection will switch off the heaters.

Hence, with this regulation, the heating voltage is guaranteed to be equal to 9 V when VBAT is from 9 to 16 V.

The step-up converter of this example is conceived to produce a constant heating voltage higher than the VBAT supply voltage in all the supply range, namely:

VBAT=9 to 16 V
Heater 1, 2, 3 or 4: Voltage=16 V if VBAT<=16 V
If VBAT>16 V, the heating voltage would follow VBAT, but in this case the overvoltage protection will switch off the heaters.

With this regulation, the heating voltage is guaranteed to be equal to 16 V when VBAT is from 9 to 16 V.

In case of a step-up regulation, a higher heating power will be reached with the same electrical contacts and the same electronic components, than with a step-down regulation. For example, with maximum 12 A per contact, the maximum heating power with a step-down regulation at 9 V is 108 W. With a step-up regulation at 16 V, the maximum heating power is 192 W with the same current.

The described solution provides a constant power over the complete normal power range of the battery (from 9 to 16 V) and in this way, guarantees the heating performances for the SCR system heater for the full power supply range.

The lifetime of the SCR electronic and heating components is increased by reducing the electrical current in the SCR heaters with the step-up heating power regulation.

The available heating power from the SCR electronic unit increases in case of step-up power regulation due to the reduced heating current.

Figure 1:
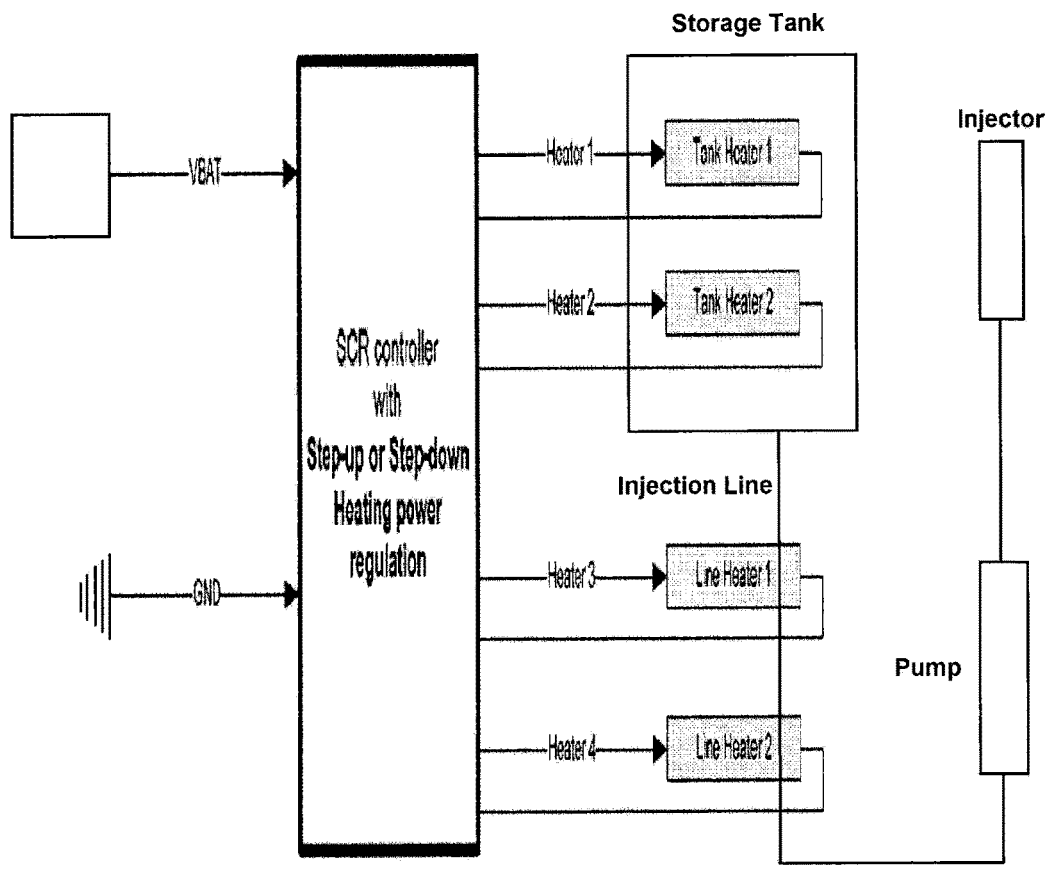
FIG. 1 is a schematic representation of a fluid injection system according to an embodiment of the present invention.
Figure 2:
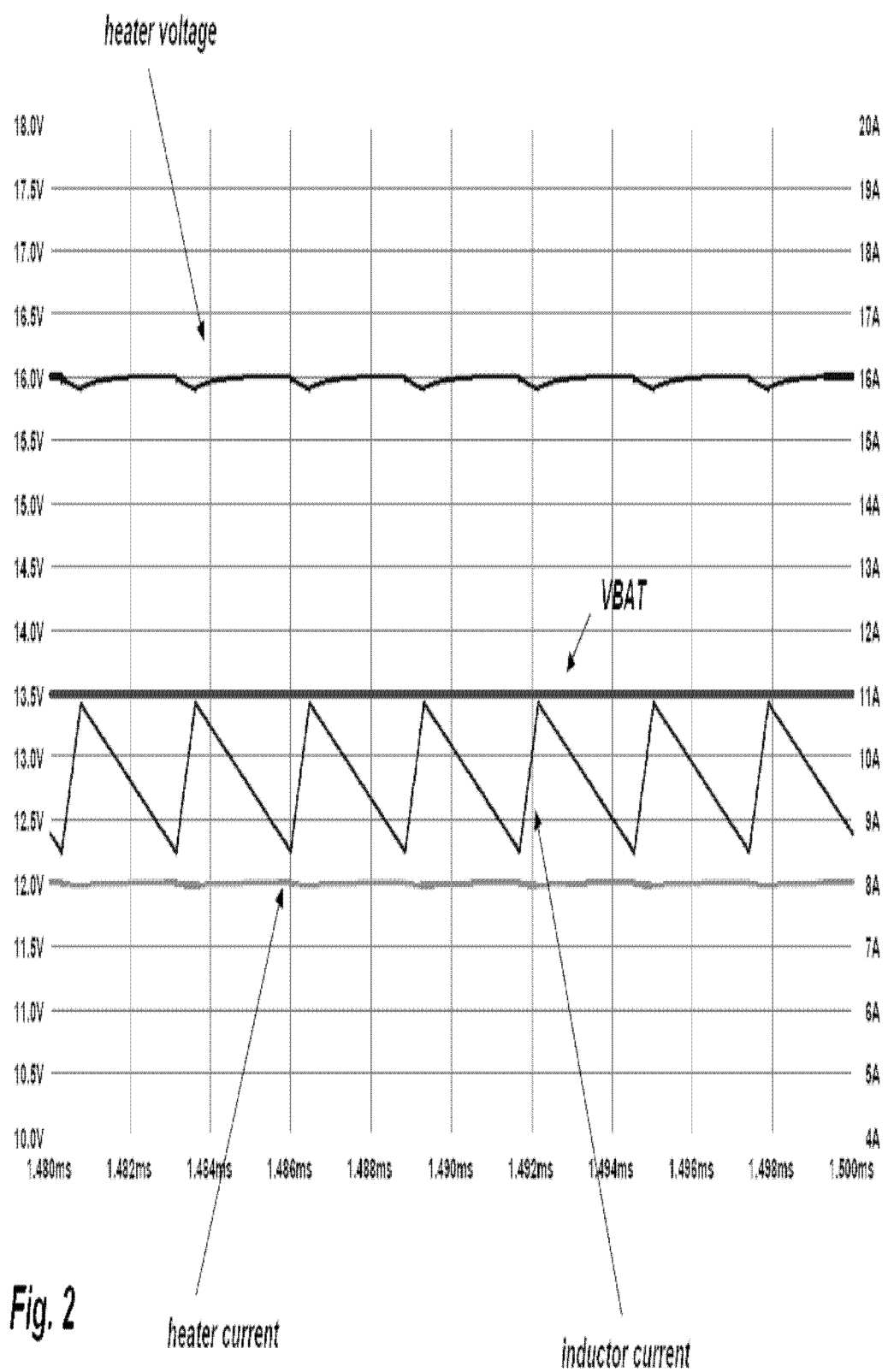
FIG. 2 is a diagram simulating the voltage and current evolution as a function of time, in the case of a step-up heating regulation of the system of FIG. 1.

FIG. 2 is a simulation showing the voltage and current traces in case of a step-up heating regulation, which is preferred in the frame of the invention for the reasons explained above.

In this simulation, VBAT=13.5 V; heater voltage=16 V; heating current=8 A; inductor current of the step-up converter is between 8.4 A and 11 A.

In this example, the heater resistance is 2 Ohm and the provided constant power from the step-up converter is 128 W.

The accuracy of the heating voltage regulation is <1%. If the heater resistance variation is +/−20%, the heating current and heating power will follow, but the heating voltage regulation will be constant between 9 V and 16 V Battery Voltage (VBAT).

As explained above, using a step-down converter or a step-up converter allows the controller to provide a constant voltage to the heater, independently of the supply voltage received from the vehicle battery. Power regulation could be insured by PWM (Pulse Width Modulation) as described in EP 2375854 also in the name of the applicant but the disadvantage is the big heater current variation. Combination of the DC/DC conversion (step-down or step-up) as a first power regulation stage and PWM regulation as a second power regulation stage combines the advantages of the two methods: constant voltage supply delivered by the DC-DC converter and the big range of power regulation from the PWM method. This combination will allow to regulate the heater power in function of the current flowing through the heaters, and/or (2) the temperature of the fluid, and/or (3) the ambient temperature, and/or (4) a defined heating strategy. If more than one heater is used, one or more DC-DC converters will be used in function of the requested power. For each heater individual PWM regulation is necessary

The invention claimed is:
1. A vehicular fluid injection system comprising:
a storage tank;
an injection line;
a heating system, wherein the heating system comprises at least one electrical heating element in the storage tank powered by a power source and at least one electrical heating element in the injection line; and an electronic control unit (ECU) including a step-up voltage converter positioned between the power source and the electrical heating elements, wherein the step-up voltage converter is a DC-to-DC converter configured to electronically vary its voltage output, or to vary its voltage output in a step by step manner, and the ECU provides a first and a second power regulation stages of the at least one electrical heating element, a DC-to-DC conversion being the first power regulation stage and a pulse width modulation (PWM) regulation being the second power regulation stage, and wherein the ECU is configured to switch off the at least one electrical heating element when supply voltage of the power source exceeds a predetermined voltage.

2. The vehicular fluid injection system according to claim 1, wherein a fluid is an ammonia precursor solution used in a selective catalytic reduction (SCR) of exhaust gases of a vehicle.

3. The vehicular fluid injection system according to claim 1, wherein at least one electrical connection connects the power source to the voltage converter, wherein one or plural electrical connections connect the voltage converter to the one or more electrical heating elements, and wherein there also is an electrical connection between ground (GND) and the voltage converter.

4. The vehicular fluid injection system according to claim 1, wherein the DC-to-DC converter comprises an inductor and a diode.

5. The vehicular fluid injection system according to claim 1, wherein the voltage converter is integrated into a controller.

6. A vehicle comprising a start and go engine and the vehicular fluid injection system according to claim 1.

7. The vehicular fluid injection system according to claim 1, wherein a plurality of line heaters is provided along the injection line.

8. The vehicular fluid injection system according to claim 1, wherein the predetermined voltage is 16V.

9. A method for heating at least one part of a vehicular fluid injection system including a tank, with at least one resistive heating element in the tank receiving an electric current from a power source, and in which a step-up voltage converter is positioned between the power source and the at least one resistive heating element, the method comprising:

providing the at least one resistive heating element with a substantially constant voltage over at least a portion of a power range supplied by the power source, wherein the step-up voltage converter is a DC-to-DC converter configured to electronically vary its voltage output, or to vary its voltage output in a step by step manner, and the method comprises first and second power regulation stages, a DC-to-DC conversion being the first power regulation stage and a pulse width modulation (PWM) regulation being the second power regulation stage, and wherein the method further comprises switching off the at least one resistive heating element when supply voltage of the power source exceeds a predetermined voltage.

10. The method according to claim 9, wherein the predetermined voltage is 16V.

11. A vehicular fluid injection system comprising:
a power source;
a tank including at least one heater; and
an electronic control unit (ECU) including a step-up voltage converter which is a DC-to-DC converter configured to electronically vary its voltage output, or to vary its voltage output in a step by step manner, the ECU providing a first and a second power regulation stages of the at least one heater, a DC-to-DC conversion being the first power regulation stage and a pulse width modulation (PWM) regulation being the second power regulation stage, wherein the ECU comprises a power metal-oxide-semiconductor field effect transistor (MOSFET) switch configured to switch off the at least one heater when supply voltage of the power source exceeds a predetermined voltage.

12. The system according to claim 11, wherein the predetermined voltage is 16V.

* * * * *